Figure 1:
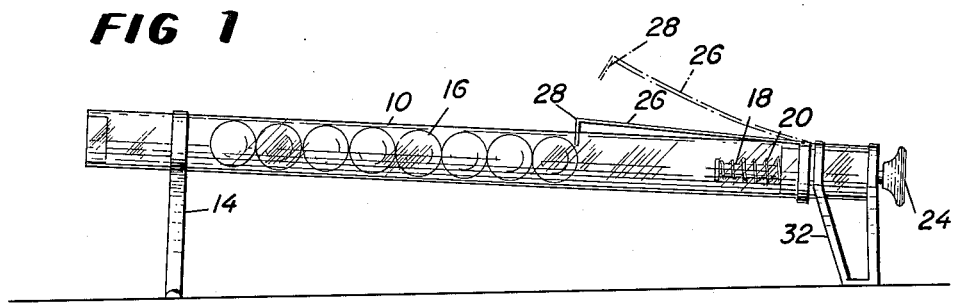

Oct. 3, 1961     C. D. JACKSON     3,002,294

EDUCATIONAL GAME DEVICE

Filed Sept. 21, 1960

INVENTOR

*Calvin D Jackson*

United States Patent Office 3,002,294
Patented Oct. 3, 1961

---

3,002,294
EDUCATIONAL GAME DEVICE
Calvin D. Jackson, Salt Lake City, Utah
Filed Sept. 21, 1960, Ser. No. 57,478
1 Claim. (Cl. 35—19)

The present invention relates to an education game device for illustrating the laws of motion.

In the teaching of simple physics, the teaching of Newton's law of motion in which there is an action equal to every reaction and vice versa, there have been in the teaching profession few devices for illustrating such law of motion.

An object of the present invention is to provide an educational game device for teaching the laws of motion as previously discovered and commonly acceptable to the teaching profession.

Another object of the present invention is to provide an education game device which lends itself ease and facility of playing, one which illustrates the laws of motion with optimum clarity, one which is simple in structure and having long life characteristics, and one which may be manufactured in quantity at reasonable cost.

With reference to the drawing, in which like numerals indicate like parts throughout the several views and in which—

Figure 2:
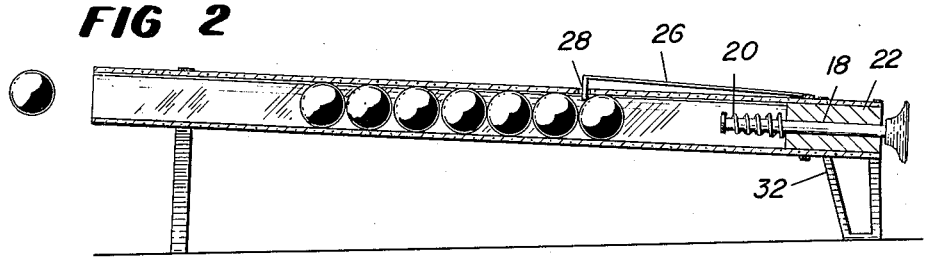
Figure 3:
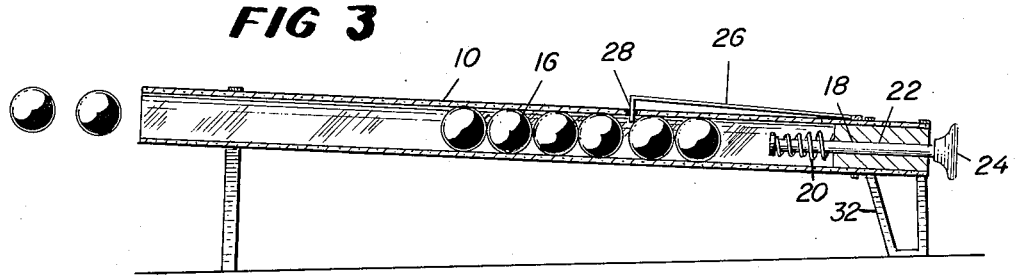
Figure 4:
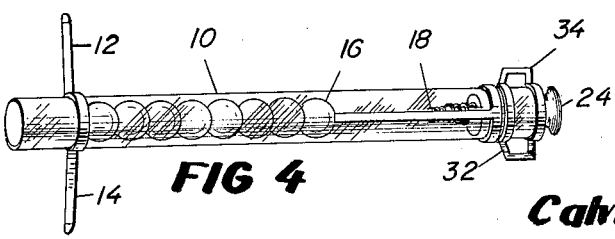

FIGURE 1 represents a side elevational view partially in section of the device of the present invention and, FIGURE 2 represents the assembly shown in FIGURE 1 in a position discharging one of the balls therefrom, and FIGURE 3 represents the device discharging two balls at once, and FIGURE 4 is a top view to show the device of the present invention.

With reference to the drawing, the numeral 10 designates an elongated transparent tube supported on its front end by a pair of outspread legs 12 and 14. The tube 10 constitutes an inclined platform on which are a plurality of rollable elements or balls 16 arranged in linear aligned abutting relation.

An impelling plunger 18 is positioned adjacent to and spaced from the lowermost one of the balls 16 and is connected to the tube 10 for movement toward and away from the lowermost one of the balls 16.

A plunger spring 20 is operatively connected to the plunger 18 and urges the plunger 18 toward the lowermost one of the balls 16. The plunger is mounted in the lower end of tube 10 in a block 22 provided therein.

On the portion of the plunger 18 exteriorly of the tube 10 is a knob 24 constituting hand actuable means by which the plunger is moved against the action of the spring 20 to a position remote from the lowermost one of the balls 16 and released for engagement with such lowermost ball 16.

Means is provided for selectively releasing the balls 16 from the upper end portion of the tube 10 so that one or more of the balls 16 may be engaged by the free end of the plunger 18. This means consists in a resilient leaf spring 26 having one end anchored on the lower end of the tube 10 and having the other end bent to form an abutment portion 28 slidably mounted in a slot provided in the tube 10 at a point spaced forwardly of the plunger 18.

In operation the tube 10 is positioned with its legs 12 and 14 on a table surface and its rearward legs 30 and 32 on the surface rearwardly of the legs 12 and 14. The number of balls 16 therein inserted into the open end of the tube 10 are next permitted to roll therealong until they are stopped by the abutment 28.

To illustrate Newton's law of motion the elements or balls 16 are permitted to slide down the tube 10 to abutting position with respect to the free end of the plunger 18, either singly or in combinations of one or two. Upon the application of a pulling force to the knob 24 and sudden release thereof, the plunger 18 is propelled forwardly into striking engagement with lowermost one of the balls 16.

If one ball 16 is between the abutment portion 28 and the plunger 18, one ball will be ejected from the open end of the tube 10.

It has been found that if two or more balls are between the abutment portion 28 and the plunger 18, upon execution of backward and forward movement of the plunger 18 the same number of balls will be ejected from the open end of the tube 10.

Although only a single embodiment of the present invention is shown and described other embodiments are contemplated and numerous changes and modifications may be made therein without departing from the spirit of the invention.

What is claimed is:

An educational game device comprising an inclined platform, a plurality of rollable target elements arranged in linear aligned abutting relation on said platform, and an impelling plunger positioned adjacent to and spaced from the lowermost one of said element and in tandem relation thereto, said plunger being connected to said platform for movement toward and away from the lowermost one of said elements, spring means operatively connected to said plunger urging the said plunger toward said lowermost one of said elements, a resilient leaf spring having one end anchored in said platform adjacent said plunger, an abutment carried on the other end of said spring and normally disposed so as to abuttingly engage a target element when the element is disposed adjacent said plunger.

References Cited in the file of this patent

UNITED STATES PATENTS

| | | |
|---|---|---|
| 1,890,950 | Sharp | Dec. 13, 1932 |
| 2,642,058 | Murphy | June 16, 1953 |